United States Patent [19]

Hing

[11] 4,412,963
[45] Nov. 1, 1983

[54] METHOD OF PRODUCING DISCHARGE LAMP ARC TUBES

[76] Inventor: Peter Hing, 13, Malling Close, Birstall Leicester, England

[21] Appl. No.: 331,990

[22] Filed: Dec. 18, 1981

[30] Foreign Application Priority Data

Dec. 20, 1980 [GB] United Kingdom ............... 8040905

[51] Int. Cl.³ ............................................ C04B 35/64
[52] U.S. Cl. ........................................ 264/61; 65/32; 65/33; 65/43; 264/65; 501/63; 501/64; 501/66; 501/69; 501/9
[58] Field of Search .............. 65/18.1, 32, 33, 36, 65/43; 264/61, 65; 501/9, 63, 64, 66, 69

[56] References Cited

U.S. PATENT DOCUMENTS

| | | | |
|---|---|---|---|
| 4,015,048 | 3/1977 | Martin | 65/33 |
| 4,162,151 | 7/1979 | Bhalla | 65/32 X |
| 4,354,964 | 10/1982 | Hing et al. | 252/518 |

FOREIGN PATENT DOCUMENTS 1571084 7/1980 United Kingdom .

Primary Examiner—Richard V. Fisher
Attorney, Agent, or Firm—Fleit, Jacobson & Cohn

[57] ABSTRACT

The invention provides a method of producing discharge lamp arc tubes of ceramic material complete with metal cermet end closure members using initially incompletely fired sintered components and a sealing composition selected from silica, alumina and magnesia in proportions such that the composition falls within the accompanying ternary phase diagram BCDEFXYZPQ. The sealing compositions may also contain up to 5% by weight of nucleating agents such as phosphorous pentoxide, rare earth oxides, titania, zirconia or chromia. The inclusion of up to 5% by weight of boric oxide improves the flow characteristics and up to 10% by weight of $Y_2O_3$, $Yb_2O_3$, $La_2O_3$, $Dy_2O_3$, $Eu_2O_3$, $HfO_2$ improves the thermal and mechanical properties of the seals. The invention eliminates the need to make a first end seal by separate sintering and sealing operations.

8 Claims, 3 Drawing Figures

METHOD OF PRODUCING DISCHARGE LAMP ARC TUBES

This invention relates to discharge lamp arc tubes and in particular to such tubes which comprise envelopes of polycrystalline alumina, sapphire or a spinel and one or more cermet end closure members sealed thereto and to a method for their production. Such tubes are useful in the construction of discharge lamps containing metal vapours, such as sodium or tin or a wide range of metal halide vapours such as sodium chloride, sodium bromide, aluminum chloride, tin chloride, scandium iodide, rare earth halides, mercuric chlorides and iodides and the like. The envelopes mentioned above are well known in the art and cermet end closures therefor are described and claimed in my British specification No. 2,571,084 published July 9, 1980 and United States Serial No. 205,094 now U.S. Pat. No. 4,354,964. These cermet end closures are of value because they can be produced from materials which result in a product having a co-efficient of linear expansion which is intermediate between the materials comprising on the one hand, the arc tube envelope and on the other hand, the generally metallic electrode. A wide range of cermet materials can be produced, depending on the particular co-efficient of linear expansion which is required. Particularly preferred types of cermet are those comprising alumina and tungsten or alumina and molybdenum. These may suitably contain a volume fraction of metal of from 0.045 to 0.2 where volume fraction is defined as the ratio of the volume of the metal to the total volume of the ceramic and metal and will normally have a co-efficient of linear expansion from 50 to $85.10^{-7}$ per °C. over a range of 100° to 1000° C.

The above arc tubes are normally produced by sealing the sintered ceramic arc tube and the sintered cermet end closure together by means of a composition such as that disclosed in my United States application Ser. No. 205,094 now U.S. Pat. No. 4,354,964.

It is an object of the present application to provide an alternative method of producing such discharge lamp arc tubes.

Accordingly there is provided a method of producing a discharge lamp arc tube which method comprises forming an assembly of one sintered cermet end closure member hermetically sealed to a ceramic arc tube of polycrystalline alumina, sapphire or a spinel by means of the following steps:

providing an arc tube in the incompletely fired state, providing a cermet end closure member in the incompletely fired state complete with an electrode assembled thereto, applying a layer of sealing composition between said end closure member and said arc tube and sintering the assembled arc tube and cermet end closure member complete with electrode at a temperature of from 1800°–1900° C. in a vacuum, inert gas or in a hydrogen atmosphere.

According to a preferred method of the invention the sealing composition comprises silica, alumina and magnesia in proportions such that the composition falls within the area BCDEFXYZPQ on the accompanying ternary phase diagram.

The method of the invention has the advantage that it eliminates the need to make a first end seal by an operation separate from the firing of the arc tube and closure member. That is to say it eliminates the necessity to manufacture a completely fired cermet, a completely fired arc tube and then join them together.

The sealing compositions within the said area BCDEFXYZPQ have relatively high melting points, generally in excess of 1700° C. and are thus suited for use in a sintering operation which as stated above, is carried out at a temperature of from 1800° to 1900° C.

Certain of the sealing compositions have an alumina content of less than 45% by weight and specific examples of these, together with their melting points are shown in the following Table 1.

TABLE 1

| No. | MgO | $Al_2O_3$ | $SiO_2$ | $B_2O_3$ | $P_2O_5$ | MELTING POINT |
|-----|------|------|------|------|------|------|
| 1 | 15.2 | 42.0 | 42.8 | — | — | 1700 |
| 2 | 15.0 | 42.0 | 43.0 | — | — | 1700 |
| 3 | 43.0 | 22.0 | 35.0 | — | — | 1800 |
| 4 | 23.0 | 35.0 | 38.0 | 3.0 | 1.0 | 1800 |
| 5 | 27.0 | 35.0 | 38.0 | — | — | 1850 |
| 6 | 63.0 | — | 37.0 | — | — | 1890 |
| 7 | 56.0 | 16.0 | 28.0 | — | — | 1890 |

It has been found that certain compositions having 70% by weight or more of alumina can be used and examples of these are set out in Table 2.

TABLE 2

| No. | MgO | $Al_2O_3$ | $SiO_2$ |
|-----|------|------|------|
| 1 | — | 71.8 | 28.2 |
| 2 | 2.0 | 71.8 | 26.2 |
| 3 | 4.0 | 71.8 | 24.2 |
| 4 | 6.0 | 71.8 | 22.2 |
| 5 | 8.0 | 70.0 | 22.0 |
| 6 | 10.0 | 70.0 | 22.0 |

In addition to the main constituents, the sealing composition may contain small amounts of nucleating agents such as phosphorous pentoxide (up to 5% by weight); rare earth oxides, titania, zirconia or chromia can be included in the starting materials which are helpful in controlling the size and extent of the crystalline phase during in-situ sealing operation. It has also been found that up to 5% by weight of boric oxide can be incorporated in the composition to improve the flow characteristics of the sealing compounds without any adverse effect on seal performance. Also up to 10% by weight of rare earth oxides such as $Y_2O_3$, $Yb_2O_3$, $La_2O_3$, $Dy_2O_3$, $Eu_2O_3$, $HfO_2$ can be included in the compositions which improve the thermal and mechanical properties of the joints. Generally speaking the sealing compositions utilised in the invention may be obtained by taking the starting ingredients in the form of fine powders and tumbler mixing for about 1 hour. The appropriate amount of the major oxide components may be added in the form of a precursor soluble salt such as a nitrate, a sulphate or an oxalate. The minor constituents may likewise be added either in the form of the oxide or, preferably, as a soluble salt. The mixture is then fused at about 200° C. in a high purity aluminium crucible for about 2 hours to homogenize the mixture, followed by calcination at a temperature of up to 1200° C. for about 7 hours in air or an inert atmosphere. The calcined oxides are then crushed and sieved through a 250 micro mesh. An alternative method to homogenize the components is to melt the mixture at about 1650° C. in air or in a controlled atmosphere in a crucible made from platinum containing 10% rhodium or in an iridium crucible for materials with melting points higher than 1650° C. This melt is then stirred for several hours and the resulting glass quenched in distilled water. The mixture is then dried and milled to form a fine glass powder, which may then be formed into suitable annular discs or frits. Up to 2% by weight of a binder such as polyvinyl alcohol may be added which assists in the automatic pressing of the annular discs or frits. This binder has to be removed prior to sealing by preheating or premelting.

The invention will now be described by way of example only and with reference to the accompanying drawings in which.

Figure 1:
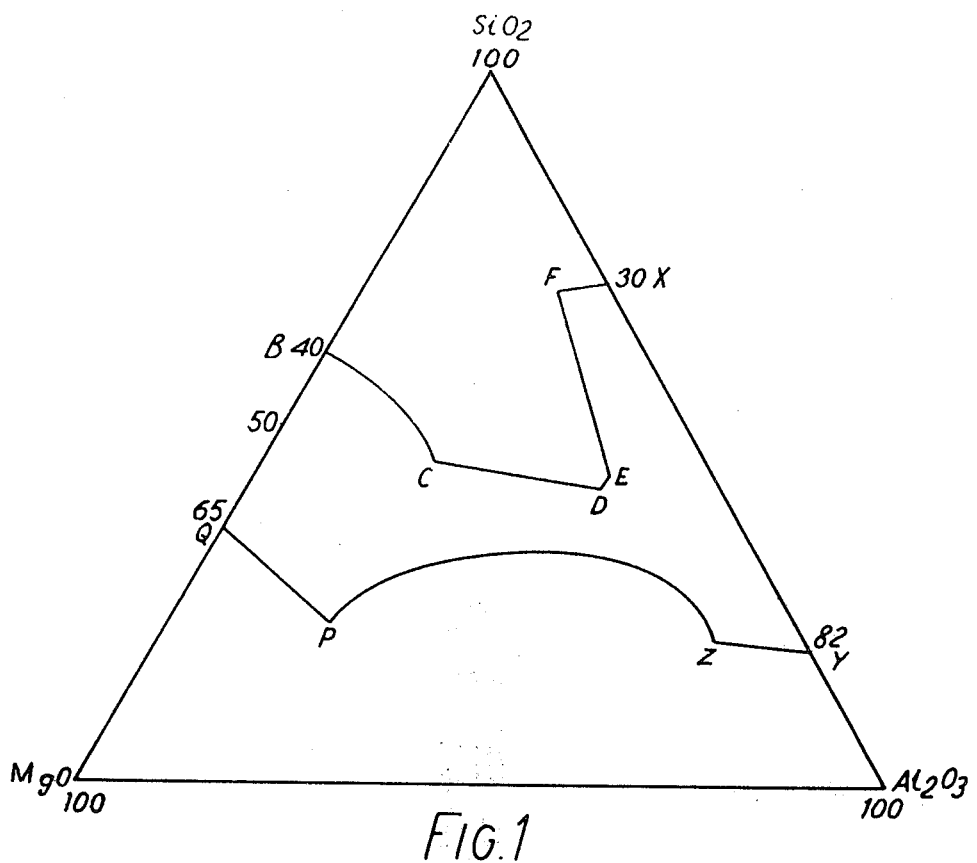
FIG. 1 is a ternary phase diagram in terms of weight percent defining compositions useful in the practice of the invention.
Figures 2, 3:
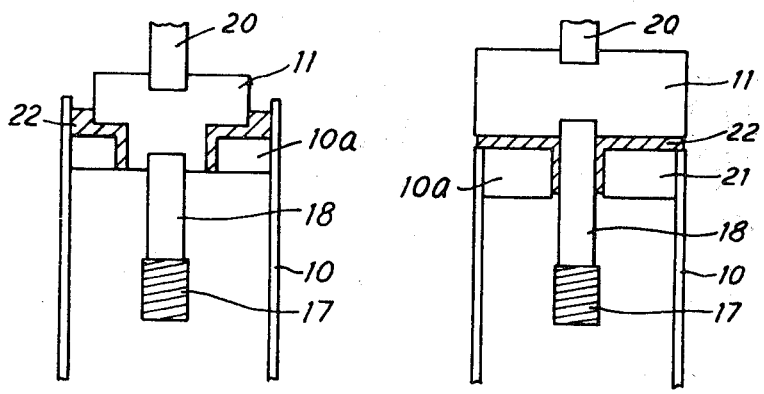
FIG. 2 is an illustration of an end closure member, sealed to one end of a lamp in one version of the invention.
FIG. 3 is an illustration of an end closure member sealed to one end of a lamp in another version of the invention.

In FIG. 2 an incompletely fired tube 10 of alumina material has an incompletely fired alumina plug 10a attached to it by smearing with an alumina slurry and partial sintering or by direct partial sintering without the use of slurry, the slurry being useful to hold the plug in position. It should be appreciated that this assembly is not completely sintered but is prefired merely to a stage where it can be handled for subsequent processing. An end closure member 11 of cermet material produced by pressing or machining is provided complete with conducting members 20 and 18 and with conductor 18 having an electrode 17 attached thereto. This end closure member 11 is also in an incompletely fired state similar to that of the arc tube 10 and plus 10a. An initially annular disc of sealing material selected from Table 1 is interposed between the surfaces of the end closure member 11 and the arc tube. The sealing composition has the property such that at the sintering temperature of around 1800° C. the sealing composition will wet the surfaces of the closure member and the end surfaces of the arc tube and will thus be capable of forming a hermetic seal of the shape shown at 22. If the composition chosen has a melting temperature of above 1800° C., the sintering temperature should be increased accordingly. This assembly is then fired until complete sintering takes place resulting in the hermetic seal being formed. It is useful if the top end of the tube 10 projects beyond the outer surface of the plug 10a as this forms an enclosure for the sealing material to flow into as shown.

A variation as shown in FIG. 3. In FIG. 3 the tube 10 and plug 10a are trimmed off to provide a flush outer surface. An end closure member 11 is attached as before by means of sealing composition 22. In this case the end closure member is substantially the same overall diameter as the tube 10. It will be appreciated that in FIGS. 2 and 3 the sealing composition 22 is shown much exaggerated for the purposes of the description. It will be appreciated the above method steps will be carried out in a vacuum, inert gas or hydrogen atmosphere as preferred.

In place of the annular disc of sealing material, a powder (glass or calcined oxide) of the material may be used.

What I claim is:

1. A method of producing an arc tube for a discharge lamp which method comprises forming an assembly of one sintered cermet end closure member hermetically sealed to a ceramic arc tube of polycrystalline alumina, sapphire or a spinel by means of the following steps:

providing an arc tube in the incompletely fired state, providing an end closure member in the incompletely fired state complete with an electrode assembled thereto, applying a layer of sealing composition between said end closure member and said arc tube and sintering the assembled arc tube and end closure complete with electrode at a temperature of from 1800° C. to 1900° C. in a vacuum, inert gas or a hydrogen atmosphere wherein said sealing composition comprises silica, alumina and magnesia in proportions such that said composition falls between the area BCDEFXYZPQ on the accompanying ternary phase diagram.

2. A method of producing an arc tube for a discharge lamp according to claim 1 wherein the cermet material comprises alumina and tungsten or alumina and molybdenum.

3. A method of producing an arc tube according to claim 1 wherein said sealing composition includes minor additions of nucleating agents selected from phosphorus pentoxide, titania, zirconia or chromia.

4. A method of producing an arc tube for a discharge lamp according to claim 3 wherein said nucleating agent is added in an amount up to about 5% by weight.

5. A method of producing an arc tube for a discharge lamp according to claim 1 wherein said sealing composition includes up to about 5% by weight of boric oxide.

6. A method of producing an arc tube for a discharge lamp according to claim 1 wherein said sealing composition includes up to about 10% by weight of rare earth oxides.

7. A method of producing an arc tube for a discharge lamp according to claim 6 wherein said rare earth oxides are selected from $Y_2O_3$, $Yb_2O_3$, $La_2O_3$, $Dy_2O_3$, $Eu_2O_3$ and $HfO_2$.

8. A method of producing an arc tube for a discharge lamp according to claim 1 wherein the volume fraction of metal in the cermet material is between 0.045 and 0.2.

* * * * *